Sept. 15, 1970 JEAN-CLAUDE DE SIMONE ET AL 3,529,187

MAGNETOHYDRODYNAMIC GENERATOR

Filed Nov. 13, 1968 4 Sheets-Sheet 1

Sept. 15, 1970 JEAN-CLAUDE DE SIMONE ET AL 3,529,187

MAGNETOHYDRODYNAMIC GENERATOR

Filed Nov. 13, 1968 4 Sheets-Sheet 3

United States Patent Office 3,529,187
Patented Sept. 15, 1970

3,529,187
MAGNETOHYDRODYNAMIC GENERATOR

Jean-Claude de Simone, Paris, and Jean-Francois D. Ecomard, Chilly-Mazarin, France, assignors to Compagnie Generale d'Electricite, Paris, France, a corporation of France Filed Nov. 13, 1968, Ser. No. 775,244
Claims priority, application France, Nov. 14, 1967, 128,148
Int. Cl. H02n 4/02
U.S. Cl. 310—11 13 Claims

ABSTRACT OF THE DISCLOSURE

A conversion nozzle for a magnetohydrodynamic generator has stacked electrically conductive members which are electrically insulated from each other. At least one metallic O-ring packing partially engages a groove in one of the two adjacent conductive members to provide a fluid-tight seal between the members.

Figures 1, 2, 3:
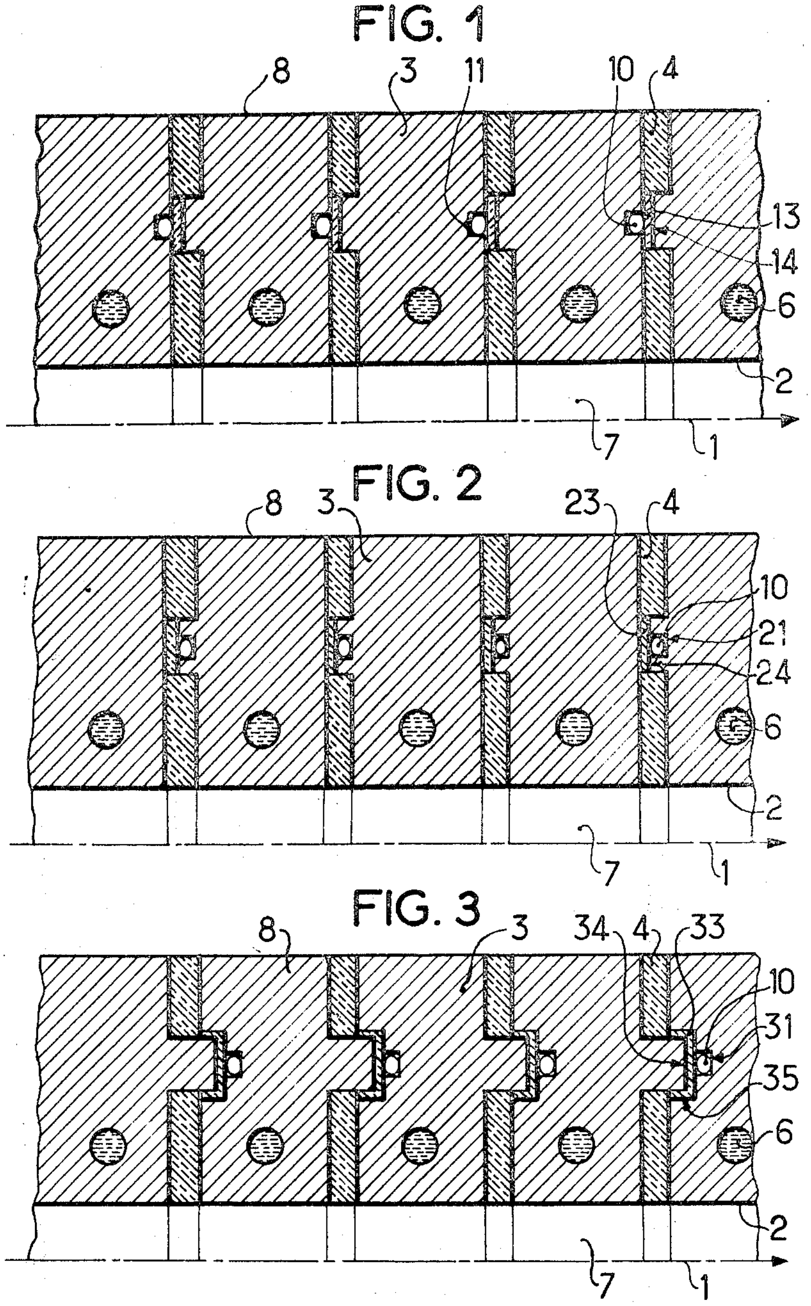

The present invention relates to generators of the magnetohydrodynamic (MHD) type and more particularly to the MHD conversion nozzles.

That one is able to construct MHD nozzles by stacking metallic frames or rings together in assembled relationship which are insulated from each other by elements of insulating material is known in the art. In the known forms of construction of such nozzles, it is difficult to ensure satisfactory gas-tightness between two neighboring conductive parts when the walls of the nozzle, although cooled, are nevertheless brought to a relatively high temperature for example 500° C.

One object of the present invention is to provide a nozzle in which the fluid-tightness between the conductive members is excellent, which does not involve excessive or complicated construction, and which maintains sufficient electrical insulation between the various conductive members.

The invention concerns a conversion nozzle, preferably for a generator of the magnetohydrodynamic type. The nozzle is formed by stacking electrically conductive members, such as rings or frames, together and electrically insulating them from each other. The nozzle is distinguished in that the fluid-tightness between two neighboring conductive members is ensured by at least one metal packing of the O-ring type which is partially engaged in a groove in one of the neighboring members.

In a preferred embodiment of the invention, the packing which ensures fluid-tightness between a first metallic member and a second metallic member bears against the base of the groove in one face of the first member and directly on the opposite face of the second member or on a boss provided on the face of the second member level with the groove. The electrical insulation between the members is ensured in both cases by means of a layer of varnish or enamel which has insulating properties at high temperatures, and which is situated on the second member.

In accordance with another embodiment of the invention, the packing between a first conductive member and a second conductive member bears against the base of a groove in a boss provided on the first member and also directly on the opposite face of the second member, which face is partially covered by an insulating enamel or varnish.

In accordance with a further embodiment of the invention, the packing between a first metallic member and second metallic member bears in a groove formed in the base of a recess in one face of the first member and also against either a boss provided on the opposite face of the second member which is covered by an insulating varnish or enamel, or on a part consisting of ceramic material which is brazed to the face of the second member.

In accordance with still a further embodiment of the invention, the fluid-tightness between two adjacent metallic members is ensured by packings, each of which bear against the base of the groove in each of the opposite faces of the two members, and also on a ceramic part which is disposed between the two opposite faces, which faces are so arranged that the ceramic member serves as a centering member therefor.

The invention will be more readily understood upon detailed examination of the various embodiments of the invention, which are given as non-limiting examples, and also from the accompanying drawings in which FIGS. 1 to 7 illustrate, in a section along a plane extending along the axis of flow of the plasma, a fragment of a nozzle in the form of a solid of revolution.

FIG. 1 illustrates in section a fragment of a nozzle wall according to the invention. A sectional plane extends along the axis of flow 1 of the plasma and is perpendicular to the face 2 in contact with the plasma. In the embodiment of FIG. 1, the wall consists of a plurality of identical metallic members 3, regularly disposed and assembled by means of layers of insulating material 4. The metallic members may be in the form of rings which form a nozzle of circular cross-section or in the form of square or rectangular frames which form a nozzle of square or rectangular cross-section.

These rings or frames are either disposed perpendicularly to the axis of flow of the hot gases, as in the example shown in the figure, or, in a modified form, inclined in relation to the axis of flow. The members are cooled by a cooling fluid which flows through channels 6. The fluid-tightness betweed the interior 7 of the nozzle and the outside surface 8 of the wall is effected by means of O-ring type packings 10, which are disposed between two neighboring members. In the example of FIG. 1, the packings bear against the base of a groove 11 in one of the edges of the member 3, and also against a boss 14, which is provided on that face of the neighboring member which is opposite to the groove 11. The O-ring packing is preferably made of metal which guarantees good fluid-tightness even if the temperature of a member is high (for example, 500° C. in the case where a member is cooled with superheated steam).

When the packing is metallic, the electrical insulation between two adjacent members is effected by means of a layer 13 of insulating varnish or enamel which is resistant to high temperature and which covers the boss 14 on the member in contact with the packing. In FIG. 1, the boss 14 is covered with an insulating layer shown as being of small height; however, it is obvious that the height of the boss may be modified without departing from the scope of the present invention.

FIG. 2 illustrates a modified embodiment which differs from the preceding one by the fact that the packing 10 bears against the base of a groove 21 in a boss 24 provided on one member, and also on the face of the neighboring member 3. Electrical insulation is again effected by a thin insulating layer 23.

In the embodiment illustrated in FIG. 3, each member 3 has on one face, a boss 34 partially engaging in a recess 35, the base of which recess is formed with a groove 31. The O-ring packing 10 rests on the base of the groove 31 and bears against the boss 34 on the neighboring member. For the purpose of electrical insulation, the boss 34 is coated with an electrically insulating varnish or enamel which is resistant to high temperature.

Figure 4:
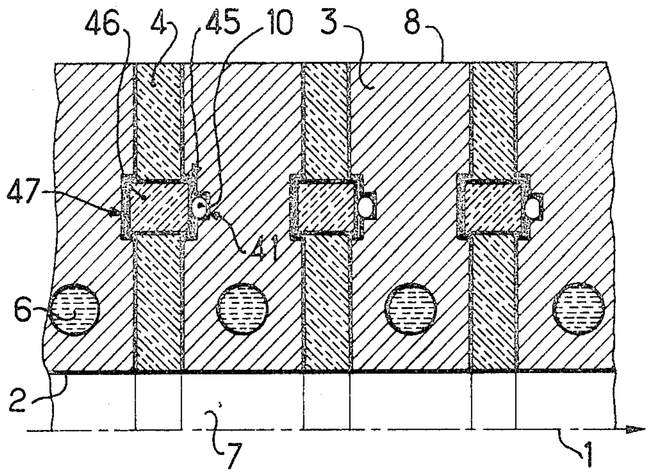

In another embodiment illustrated in FIG. 4, the packing 10 rests on the base of a groove 41 in the base of a recess 45, and the packing 10 bears on an annular part 46 consisting of ceramic material which is brazed to the base of a groove 47 in the opposite face of the neighboring member. The groove 47 facilitates the holding of the brazed joint. The ceramic part 46 partially engages the recess 45 and has the object to ensuring centering of members 3 in relation to one another. In another embodiment (not shown), the packing 10 rests in a groove formed directly in one face of the member 3, the recess being omitted.

Figure 5:
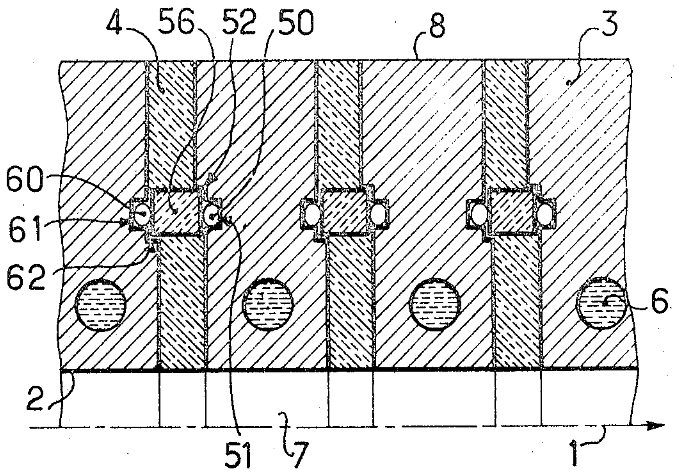

The ceramic member 46 brazed to the face of a member 3 ensures fluid-tightness by means of the single O-ring packing 10. As illustrated in FIG. 5, the centering of the member 3, which constitutes the wall, may be further facilitated and improved by disposing an annular ceramic part 56 between two neighboring members 3 whose opposite faces each have a step 52, 62.

Fluid-tightness is ensured by two packings 50 and 60 of the O-ring type, each of which bears against the base of a groove 51, 61, formed in each of the opposite faces of the members 3, and on the ceramic annular member 56 which is compressed by the two packings 50 and 60.

Figure 6:
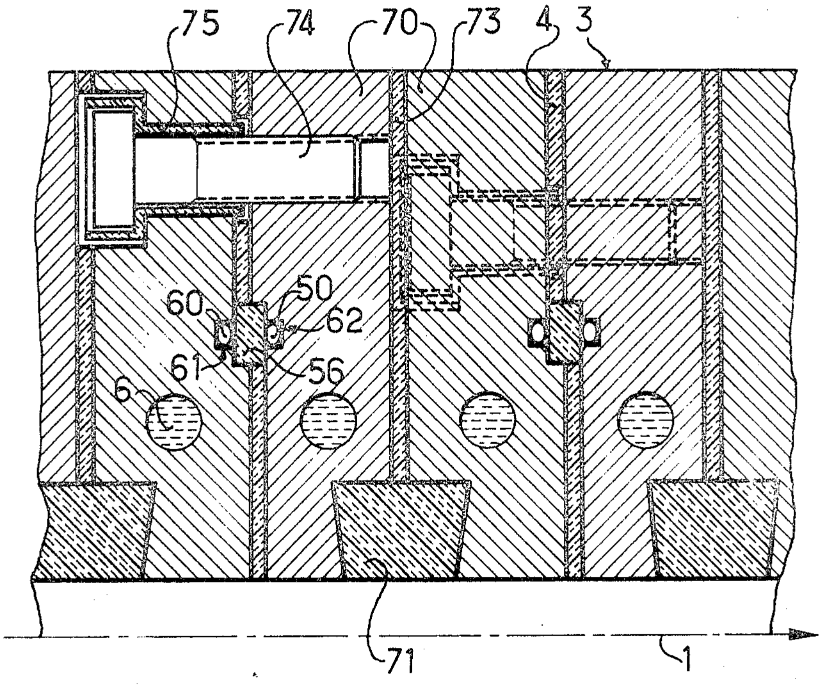

FIG. 6 illustrates a fragment of a wall in which fluid-tightness is obtained in the same way as in the wall illustrated in FIG. 5, and wherein the same reference numerals denote the same elements. The members 3 which constitute the walls are of the type described in French application No. PV 119,904 of Sept. 4, 1967 in the name of the applicants, entitled "Electrode for MHD Device and Generally for a Hall-Effect MHD Nozzle" and its Addition No. PV 124,962 of Oct. 18, 1967, also in the name of the applicants.

Members 3 each consist of two portions 70 and 71. The portion 70 is metallic and the portion 71 consists of a ceramic material. In addition, the metallic portion 70 is transversely divided into two equal parts separated by an insulating cord 73.

Figure 7:
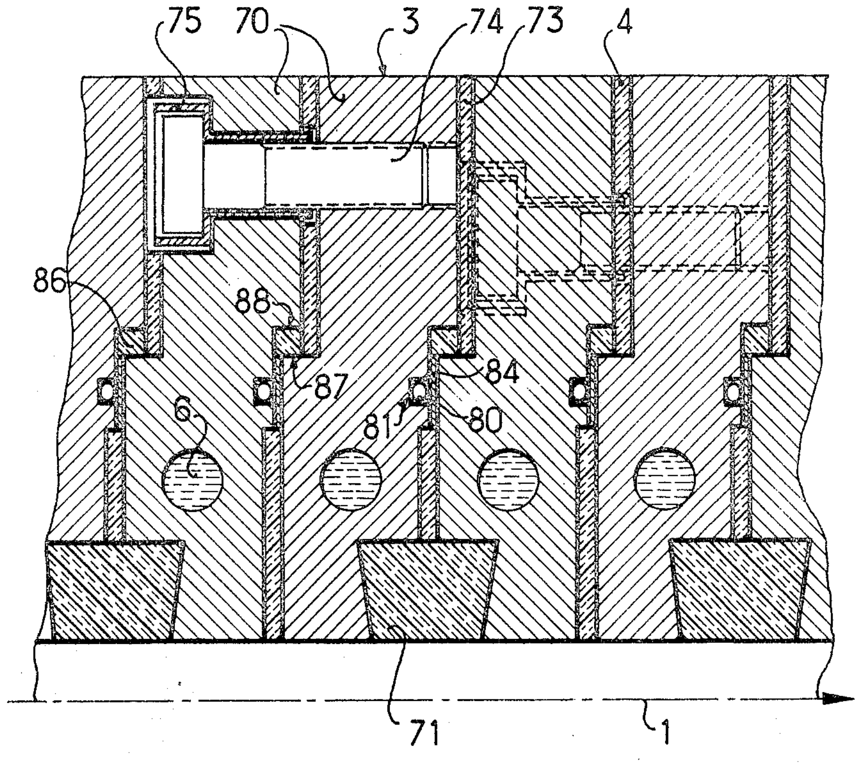

In the embodiment illustrated in FIG. 7 fluid-tightness between the two equal parts of the portion 70 is ensured by an O-ring packing 80 bearing against the base of a groove 81 in one face of a part of the portion 70 and on the plane face of the other opposite part of the packing. This plane face is covered by a layer of insulating varnish or enamel 84 which is resistant to high temperature. The centering of two neighboring members is effected by a member 86 of ceramic material which works in compression and which is disposed between the insulating cord 4 (or the cord 73) and two members 3 whose opposite faces have steps 87 and 88, respectively.

In FIGS. 6 and 7, the members 3 are preferably secured by the concentric locking action of screws 74 which are insulated by ceramic casings 75, for example of alumina. Each pair of members 3 is independently locked by locking screws which are staggered, as illustrated in FIG. 6, in relation to each member 3 by an angle compatible with the general arrangement.

Generally speaking, the embodiments of FIGS. 1 to 5 may be applied, without departing from the scope of the invention, to wall elements such as those illustrated in FIG. 7 or to any wall element of known type. The invention is also applicable to MHD nozzles formed by a stack of alternately insulating and conducting frames. O-ring packings between two neighboring frames ensure gas-tightness while maintaining the electrical insulation between the frames.

What we claim is:

1. A conversion nozzle for a magnetohydrodynamic generator having stacked electrically conductive members electrically insulated from each other, the improvement comprising: a groove in one of the two adjacent conductive members, a boss provided on the face of a second conductive member level with said groove, a layer of enamel or varnish on said second member which is insulating at high temperature and at least one metallic O-ring packing partially engaged in said groove, bearing on the base of the groove and directly on the opposite face of said boss.

2. A conversion nozzle for a magnetohydrodynamic generator having stacked electrically conductive members electrically insulated from each other, the improvement comprising: at least one metallic O-ring packing partially engaged in a groove in one of two adjacent conductive members to provide a fluid-tight seal therebetween and wherein the packing between a first conductive member and a second conductive member bears on a groove formed in the base of a reecss in one face of said first member, and on a boss provided on the opposite face of said second member which is covered by an insulating enamel or varnish.

3. A conversion nozzle according to claim 2 wherein the packing between a first conductive member and a second conductive member bears on a groove formed in the base of a recess in one face of said first member and on a part consisting of ceramic material brazed to the face of said second member.

4. A conversion nozzle according to claim 2 wherein the fluid-tight seal between two adjacent conductive members is provided by two packings, each of which bears on the base of a groove in each of the opposite faces of said two members and on a ceramic part disposed between the two opposite faces, said opposite faces being so arranged that said ceramic part serves as a centering member.

5. A conversion nozzle according to claim 2 wherein the conductive members are assembled together by screws which are insulated by ceramic casings.

6. A conversion nozzle according to claim 5 wherein said screws are staggered at a certain angle in relation to one another.

7. A conversion nozzle for a magnetohydrodynamic generator, comprising an assembly of coaxial electrically conductive annular nozzle elements and means for electrically insulating said elements from one another, characterized in that there are provided:

an annular centering element of rectangular cross-section for each pair of consecutive nozzle elements and coaxial with said nozzle elements;

a first annular depression of rectangular cross-section in a first opposed face of each pair of consecutive nozzle elements, adapted to engage said centering element and being coaxial with said nozzle elements;

a first metal O-ring disposed in each first annular depression and arranged to contact the base of said depression along the whole length of its one side and said centering element along the whole length of its other side;

and means for centering and sealing each centering element with respect to a second opposed face of each pair of consecutive nozzle elements;

whereby consecutive nozzle elements are centered with respect to one another and a fluid-tight seal is obtained between them.

8. A conversion nozzle according to claim 7, wherein the said means for centering and sealing each centering element with respect to a second opposed face of each pair of consecutive nozzle elements comprise:

a second annular depression of rectangular cross-section in said second opposed face, adapted to engage said centering element and being coaxial with said nozzle elements;

a second metal O-ring disposed in each second annular depression and arranged to contact the base of said depression along the whole length of its one side and said centering element along the whole length of its other side.

9. A conversion nozzle according to claim 7, wherein the said means for centering and sealing each centering element with respect to a second opposed face of each pair of consecutive nozzle elements comprise brazing said centering element to said second opposed face in an annular groove.

10. A conversion nozzle according to claim 7, wherein the said means for centering and sealing each centering element with respect to a second opposed face of each pair of consecutive nozzle elements comprise forming said centering element as an annular projection on and integral with said second opposed face.

11. A conversion nozzle according to claim 7, wherein said centering element is of a ceramic material.

12. A conversion nozzle according to claim 7, wherein the conductive members are assembled together by screws which are insulated by ceramic casings.

13. A conversion nozzle according to claim 12, wherein said screws are staggered at a certain angle in relation to one another.

References Cited

UNITED STATES PATENTS

| | | | |
|---|---|---|---|
| 3,242,354 | 3/1966 | Novack et al. | 310—11 |
| 3,260,867 | 7/1966 | Hurwitz et al. | 310—11 |

DAVID X. SLINEY, Primary Examiner